United States Patent [19]

Bradley

[11] 4,309,250
[45] Jan. 5, 1982

[54] BETWEEN-CYCLE LASER SYSTEM FOR DEPRESSURIZATION AND RESEALING OF MODIFIED DESIGN NUCLEAR FUEL ASSEMBLIES

[75] Inventor: John G. Bradley, Richland, Wash.

[73] Assignee: The United States of America as represented by the United States Department of Energy, Washington, D.C.

[21] Appl. No.: 55,209

[22] Filed: Jul. 5, 1979

[51] Int. Cl.³ .............................................. G21C 19/20
[52] U.S. Cl. ..................................... 376/310; 376/451
[58] Field of Search .................. 176/19 LP, 19 R, 79, 176/38, 78, 37

[56] References Cited

U.S. PATENT DOCUMENTS

| | | | |
|---|---|---|---|
| 3,146,173 | 8/1964 | Fortescue et al. | 176/79 |
| 3,406,094 | 10/1968 | Beisswenger et al. | 176/79 |
| 3,425,908 | 2/1969 | Rouge et al. | 176/78 |
| 3,505,170 | 4/1970 | Flowers et al. | 176/78 |
| 3,647,622 | 3/1972 | Andrews et al. | 176/79 |
| 3,725,635 | 4/1973 | Fink et al. | 176/79 |
| 3,836,431 | 9/1974 | Flipot et al. | 176/79 |
| 3,878,040 | 4/1975 | Martucci | 176/19 LP |
| 3,892,626 | 7/1975 | Hirose | 176/79 |
| 3,983,741 | 10/1976 | Honig et al. | 176/19 LP |
| 3,996,100 | 12/1976 | Oguma et al. | 176/79 |
| 4,003,788 | 1/1977 | Boyoko et al. | 176/79 |
| 4,028,179 | 7/1977 | Colgate | 176/38 |
| 4,042,456 | 8/1977 | Ip et al. | 176/78 |

FOREIGN PATENT DOCUMENTS 7003342 9/1970 Netherlands .......................... 176/79

Primary Examiner—Sal Cangialosi
Attorney, Agent, or Firm—Ignacio Resendez; Richard E. Constant; James E. Denny

[57] ABSTRACT

A laser beam is used to puncture fuel cladding for release of contained pressurized fission gas from plenum sections or irradiated fuel pins. Exhausted fission gases are collected and trapped for safe disposal. The laser beam, adjusted to welding mode, is subsequently used to reseal the puncture holes. The fuel assembly is returned to additional irradiation or, if at end of reactivity lifetime, is routed to reprocess. The fuel assembly design provides graded cladding lengths, by rows or arrays, such that the cladding of each component fuel element of the assembly is accessible to laser beam reception.

4 Claims, 6 Drawing Figures

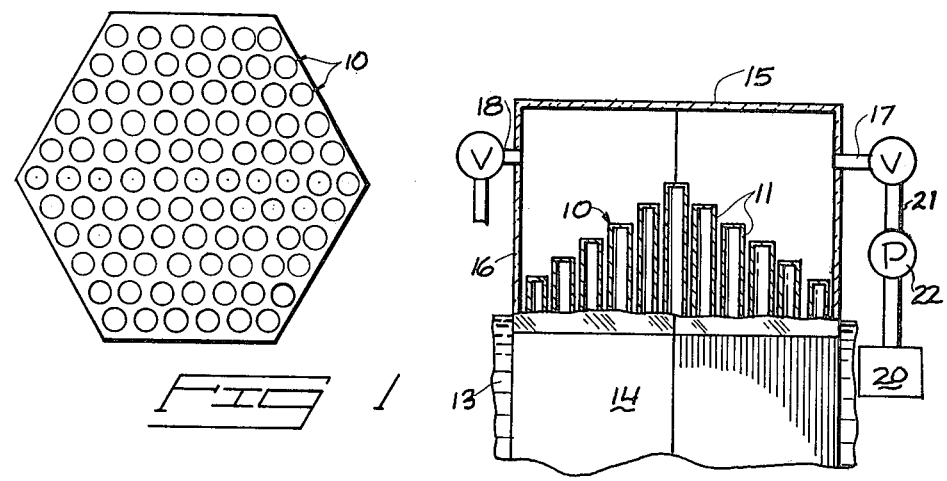
FIG 1
FIG 4
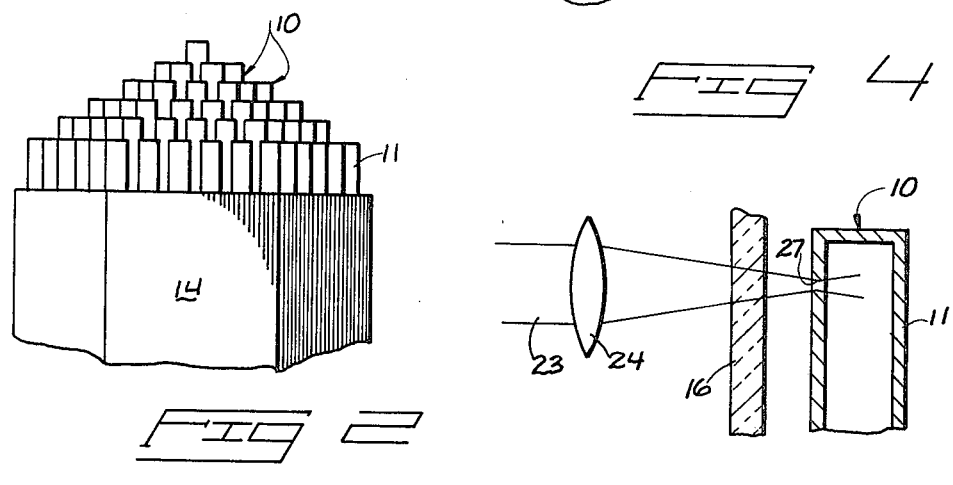
FIG 2
FIG 5
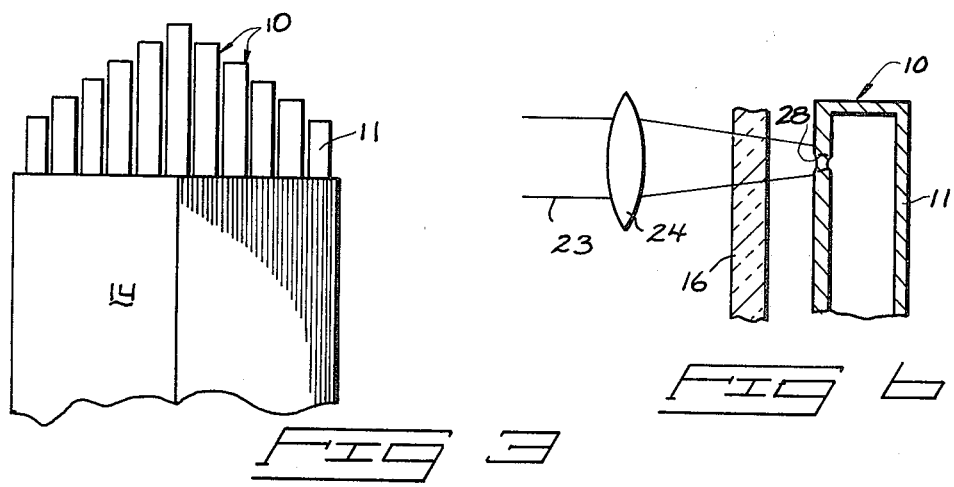
FIG 3
FIG 6

BETWEEN-CYCLE LASER SYSTEM FOR DEPRESSURIZATION AND RESEALING OF MODIFIED DESIGN NUCLEAR FUEL ASSEMBLIES

BACKGROUND OF THE INVENTION

Nuclear fuel elements typically comprise radioactive fuel materials contained within a hermetic or gastight sealed cladding. The sealed cladding is utilized to contain the gaseous by-products of the fission process. However, as the reaction continues in a reactor, these gaseous fission by-products build up within the sealed cladding. The resulting pressurization due to retention of large amounts of gaseous products within a limited interior volume can lead to cladding rupture. This is particularly true in the case of cladding in the form of thin-walled tubing. The useful life of fuel elements does not necessary depend upon the time during which it can sustain a chain reaction, but upon the risk of potential cladding failure.

The reactivity lifetime of a nuclear fuel element is affected by the nature and quantity of cladding materials about the fuel, as well as by the progressively developed quantities of fission by-products. In designing a fuel assembly, one must balance the thickness of the cladding material necessary to insure against cladding rupture against the increasing parasitic absorption of neutrons, which is directly proportional to cladding thickness. While the use of thicker cladding might permit the containment or retention of gaseous by-products at higher pressures, this leads to increased parasitic absorption of neutrons by both the cladding and the gaseous by-products.

In newer forms of fast reactors, thin cladding is desired to reduce the parasitic absorption of neutrons and to minimize flux moderation. The thinner cladding in turn reduces the amount of gaseous pressure that can be permitted to build up within each fuel element. Under conventional practice, such design factors greatly shorten the reactivity lifetime of a fuel element between reprocessing cycles.

The present invention is designed to permit use of thinner cladding, reduced parasitic neutron absorption by both the cladding and gaseous fission by-products, and longer potential in-reactor service of fuel elements with reduced refabrication frequency. This is accomplished by periodic venting of each fuel element to release the gaseous fission by-products. This periodic release of the gaseous fission by-products within the cladding tubes further permits the design of reactors using shorter fuel assemblies and generally more compact operating and handling equipment in all parts of the reactor relating to the fuel elements.

DESCRIPTION OF THE DRAWINGS

FIG. 1 is a top end view of a fuel assembly constructed according to the present invention. Top end hardware has been omitted to allow direct view of the top ends of fuel pins;

FIG. 2 is a partial elevation view showing fuel pin cladding incremental length increasing from the outermost hexagonal ring to a maximum length at the central pin of the array of concentric hexagonal arrangement of FIG. 1;

FIG. 3 shows an alternate arrangement of the fuel pins of FIG. 1 where parallel rows of the pin array present a sequence of increasing lengths toward a center row;

FIG. 4 is a schematic view showing release of gaseous fission by-products;

FIG. 5 is a schematic view showing puncture of the cladding; and

FIG. 6 is a schematic view showing resealing of the cladding.

DESCRIPTION OF THE PREFERRED EMBODIMENT

The present invention can be used in the design of various types of nuclear reactors. It is illustrated in the drawings with respect to fuel assemblies comprising a large number of pins arranged in individual assemblies that can be inserted into or removed from the reactor core. As shown in FIGS. 1 and 2, the fuel pins 10 each basically comprise gastight sealed cladding 11 containing a quantity of nuclear fuel. In a reactor having vertical fuel elements, the fuel will be located at the bottom end of each tubular cladding 11. Adjacent to the fuel is a plenum region within the cladding 11. It basically comprises a hollow chamber within which gaseous fission by-products are retained as they are produced by fission processes. The build-up of interior pressure by such gaseous fission by-products is a significant factor in determining the operational lifetime of a reactor fuel element. The pressure within the cladding 11 must not exceed its structural strength. Furthermore, the progressive neutron capture by the gaseous fission by-products progressively poisons the fuel within the cladding 11.

In order to permit the use of fuel elements having shorter plenum regions and thinner cladding walls, it is proposed that the fission gas pressure be periodically released by laser puncture and resealing. This process requires that the fuel elements be physically arranged so that the outer ends of the plenum regions are staggered longitudinally in position, leaving a portion of the plenum region at the end of each fuel element exposed to one side of the fuel assembly. See FIGS. 2 and 3. Since the quantity of fuel 12 within each cladding will normally be equal in length to that within each cladding 11, the plenum regions will vary in length by rows or arrays.

In the illustrated example, shown in FIGS. 1 and 2, the fuel elements 10 are arranged in a hexagonal configuration, and the length of the respective plenum regions of the individual face pins 10 increases progressively from the outer concentric rows of fuel pins to the center fuel pin. This arrangement is amenable to fuel assemblies where the fuel elements are arranged in a hexagonal, square, triangular or other geometric pattern.

FIG. 3 shows a modified arrangement in which the fuel pins 10 are staggered in length along straight transverse rows, the height of each pin within the respective rows increasing from the bottom of the assembly shown in FIG. 1 to the center transverse row, and decreasing from the center row to that shown at the top of the assembly. The fuel pins 10 need not be arranged concentrically, so long as the outer plenum end of each pin is within an array exposed to one side for access by a laser beam.

As shown, the fuel pins 10 are surrounded by a housing 14. The staggered plenum region ends of the fuel pins 10 are located at one end of the housing. This will be the upper end in the case of vertical nuclear fuel pin assemblies.

The housing 14 for the fuel pin assembly would normally include a conventional upper shroud (not shown) having a lifting bail that is typically for raising of the fuel assembly and for removing it from one location to another. During the practice of the present process, the removed fuel assembly would first be placed in a container of a liquid coolant 13, such as water in the case of fuel assemblies for light water reactors or pressurized water reactors. The shroud or other cover assembly used in the reactor design would then be removed to expose the upper ends of the individual fuel pins.

After the shroud or cover of the fuel assembly has been removed, a generally cylindrical cover 16 having an upper closed end 15 is placed over the fuel pin assembly and positioned as shown in FIG. 4. The cover 16 is made from a material transparent to a laser beam, such as uniform wall thickness glass tubing. One type of applicable material would be boropyrex glass, which is available from various manufacturers, with the cover side walls polished smooth for laser focusing. An effective seal between the transparent cover 16 and the housing 14 is provided by compatible design of the mating surfaces. It should be noted that the fuel assembly is submerged in the coolant 13 for heat removal purposes during such processing.

The cover 16 is provided with a controllable exit port 17 in communication with its interior chamber that surrounds and encloses the upwardly projecting plenum sections of the fuel pins 10. A supplementary filler port 18 should also be provided where back pressurization of the evacuated pins is desired.

The exit port 17 may be operatively connected to a cryogenic or other suitable system for gas collection and disposal, shown generally at 20. This system might include a suitable pump 22. The system 20 and pump 22 are arranged along a conduit 21 leading to the exit port 17.

The placement of each fuel assembly within a container of liquid coolant 13 further serves to seal the lower end of each fuel assembly during evacuation of the gaseous fission by-products from the respective plenum chambers of fuel pins 10. The hydrostatic seal provided by the surrounding liquid prevents the released gas from flowing freely out of or into the pin region through the usual bottom opening of the fuel assembly.

In utilizing the system, a laser source is indexed to each exposed plenum region of the respective fuel pins 10 and is pulsed in a drilling mode to puncture the cladding wall (FIG. 5). The gaseous fission by-products within the cladding 11 are thus released into the enclosure formed by housing 14 and cover 16 and by the liquid coolant 13. The gas can be exhausted by operation of pump 22 and can be liquified or solidified by the processing system generally shown at 20. Resealing of each fuel element 10 can be subsequently accomplished by adjusting the laser focus to a welding mode (FIG. 6), the beam being indexed in precisely the same location as during its use in the drilling mode.

The puncturing and resealing of the cladding tube is schematically illustrated in FIGS. 5 and 6.

FIG. 5 shows a laser beam 23 focused by a lens 24 through the side wall of the cover 16 and drilling or puncturing a typical cladding 11 along the exposed portion of its plenum region. By varying the relative positions of the lens 24 and cladding 11 as shown in FIG. 6 the focus of the laser beam can be modified to melt the material surrounding the punctured hole 27 (formed in FIG. 5) and reseal it by a weld (shown at 28 in FIG. 6). The details of this laser puncturing and resealing system are known to those skilled in this field.

The sequence of the puncturing and resealing operations by single fuel elements or entire fuel assemblies is optional unless backfilling of specifically selected fuel elements is needed. If selected fuel elements require backfilling of the cladding tubes, these fuel elements must be drilled and resealed in a required sequence including the necessary backfilling procedure.

The anticipated normal procedure in processing a fuel assembly would be to first penetrate all the fuel pins 10 in the assembly, while evacuating the chamber defined within the cover 16 to remove the gaseous by-products from the plenum chambers as a group, and then backfill the chamber within housing 16 and the plenum regions of the fuel pins 10 with helium. Several operations may be used to flush out residual by-products by alternate backfilling and evacuation under helium. When this has been completed, the chamber within cover 16 and the plenum regions of the fuel pins 10 would be finally filled with helium gas at about atmospheric pressure. The penetrations opened in the side walls of the cladding for all the fuel pins would then be welded shut. After removal of the by-products and backfilling has been completed, the cover 16 would be removed and the conventional shroud or other cover would be rejoined onto the housing 14 of the fuel assembly by normal processes, such as welding.

Before the fuel assembly is returned to service, it is desirable to check the weldment of each fuel pin by using both visual inspection procedures and also a pressure check over an extended period of time. Such procedures are well known to those skilled in this field.

In the fuel pin arrangement illustrated in FIG. 2, each concentric row or ring of fuel pins about the center of the assembly are at a level above the remaining rows formed beyond it toward the outer edge of the assembly. The variations in elevation from one row to the next permit access to the fuel pins by laser beams. In this concentric arrangement, both rotary and lateral indexing of the fuel assembly or laser beam is necessary in order to properly align the cladding walls of each fuel pin in the path of the laser beam. An alternative arrangement shown in FIG. 3 utilizes fuel pins 10 in rows arranged by length in straight lines across the width of the fuel assembly. In this instance, each row is at a different elevational level in a constant progression toward the center row. This facilitates focusing of the laser beam onto the individual fuel pins by requiring only indexing of the laser beam or fuel assembly.

The above design of a fuel assembly permits modification of the operation of a nuclear reactor. In this modified operational sequence, the fuel assemblies are used in the reactor core according to conventional processes, and sustain a chain reaction during irradiation of the fuel within them. However, the fuel assemblies may be periodically removed from the reactor core to permit selected sampling of the gaseous by-products within the cladding tubes to determine incremental exposure test levels or to extend the reactivity lifetime of the fuel materials.

The process is initiated by removing each fuel assembly from the reactor core at a selected fluence. The individual fuel pins are then vented by drilling through the cladding about exposed portions of their respective plenum regions. The gaseous fission by-products are then removed from the vented fuel pins. The cladding of the fuel pins is subsequently resealed by laser welding of the puncture holes formed through the cladding in their respective plenum regions. Finally, the fuel pins are returned to the reactor core for further irradiation.

The modified design of the fuel assembly permits higher enrichment of the fuel materials within them since pressurization within the cladding of the fuel pins will not limit the end of their useful reactivity lifetime. The shortened plenum region in each fuel pin permits shortening of the reactor core and other auxiliary equipment used in supporting and handling the fuel assemblies during reactor operation and fuel pin processing. Shortening of the fuel assemblies generally leads to reduced dimensions of all fuel handling facilities. Shorter cores are particularly significant in the design of pressurized water reactors (PWR) and boiling water reactors (BWR) in terms of improved vessel procurement economics. When applied to liquid metal cooled fast breeder reactors (LMFBR), shorter fuel assemblies will lead to significantly lower coolant inventories. All reactors will have a lower pressure drop across the fuel elements and less constriction due to the shorter dimensions of them. The design of surrounding building will be modified to accommodate the reduced vertical overhead clearance necessary for fuel handling in reactors that are charged vertically. In general there will be a significant reduction in all vertical reactor structural dimensions.

The principal advantage of this process is that it extends the reactivity lifetime of the fuel assemblies by removing fission gas from the partially used fuel pins. While it has been recognized that the fuel material of fuel pins that had been removed from nuclear reactors because of unacceptably high gaseous pressure within their plenum regions could still be reprocessed and subsequently used, such use of the fuel was only feasible after the fuel pin had been disassembled, the cladding removed and other reprocessing steps taken to reclaim the fuel and use it within a newly constructed fuel pin structure. This complicated reprocessing process has been eliminated to a large extent merely by increasing the reactivity lifetime of the fuel pin assembly by providing an effective mode for removing the gaseous fission by-products that result from use of the fuel pins within the reactor core. Without this process, operational lifetime of fuel assemblies is severely limited by the gaseous pressure built up within the individual fuel pins.

Various modifications of this concept will be evident to those skilled in this field, and the above description of the fuel assembly and reactor process is intended only as an example, and is not intended to limit the scope of the invention described herein.

Having described my invention, I claim:

1. A method of extending the life of nuclear reactor fuel pins containing a quantity of nuclear fuel within gastight sealed cladding defining a hollow plenum region at one longitudinal end of the fuel pin comprising the following steps:
   removing each fuel pin from the reactor core at a selected fluence;
   venting the removed fuel pin by laser puncturing its cladding along the plenum region thereof;
   removing the gaseous fission by-products from the vented fuel pin;
   collecting the removed by-products for processing thereof;
   resealing the vented fuel pin by closing with laser welding the puncture hole formed therein; and
   returning the fuel pin to the reactor core.

2. A method as set out in claim 1 wherein each fuel pin is punctured and subsequently resealed at a position along its cladding side walls adjacent the longitudinal end of the fuel pin remote from the radioactive fuel contained therein.

3. A fuel assembly for a nuclear reactor, comprising:
   a plurality of fuel pins each including gastight sealed cladding having a quantity of nuclear fuel within one end thereof and a hollow plenum region at its remaining end wherein the plenum regions of the cladding are of differing lengths graded by rows or arrays such that each plenum region is accessible to laser beam reception along the side walls of its cladding;
   the fuel pins being arranged in parallel positions with the plenum regions thereof at their respective remaining ends staggered longitudinally so as to expose a portion of the plenum region of each fuel pin to one side of the fuel assembly;
   housing means surrounding the fuel pins for receiving the plenum regions of the respective fuel elements in a spatial pattern with the staggered remaining ends thereof projecting outward beynd one end of the housing means;
   and a removable cover surrounding the staggered ends of the fuel pins;
   said cover being in a sealed relationship with the housing means so as to form a gastight chamber in conjunction with the housing means;
   wherein the cover comprises side walls made from a material capable of transmitting laser energy and controllable vent means in communication with the interior of the cover for selectively permitting release of gas from within the cover.

4. A system for extending the life of nuclear reactor fuel pins containing a quantity of nuclear fuel within gastight sealed cladding defining a hollow plenum region at one longitudinal end of the fuel pin, comprising:
   removing each fuel pin from the reactor core at a selected fluence;
   venting the removed fuel pin by laser puncturing its cladding along the plenum region thereof;
   removing the gaseous fission by-products from the vented fuel pin;
   collecting the removed by-products for processing thereof;
   resealing the vented fuel pin by closing with laser welding the punctured hole formed therein; and
   returning the fuel pin to the reactor core;
   the fuel pins being arranged in parallel positions with the plenum regions thereof staggered longitudinally so as to expose a portion of the plenum region of each fuel pin to one side of the fuel assembly.

* * * * *